(12) United States Patent
Bi et al.

(10) Patent No.: US 11,249,969 B2
(45) Date of Patent: Feb. 15, 2022

(54) DATA STORAGE METHOD AND APPARATUS, AND STORAGE MEDIUM

(71) Applicant: Huawei Technologies Co., Ltd., Shenzhen (CN)

(72) Inventors: Jieshan Bi, Shenzhen (CN); Chaoqiang Zhong, Shenzhen (CN); Ming Lin, Shenzhen (CN); Zhenfeng Ji, Xi'an (CN)

(73) Assignee: HUAWEI TECHOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/748,252

(22) Filed: Jan. 21, 2020

(65) Prior Publication Data
US 2020/0159708 A1 May 21, 2020

Related U.S. Application Data

(63) Continuation of application No. PCT/CN2017/095893, filed on Aug. 3, 2017.

(51) Int. Cl.
*G06F 16/22* (2019.01)
*G06F 16/28* (2019.01)
*G06F 16/27* (2019.01)

(52) U.S. Cl.
CPC ...... *G06F 16/2237* (2019.01); *G06F 16/2264* (2019.01); *G06F 16/2282* (2019.01); *G06F 16/278* (2019.01); *G06F 16/284* (2019.01)

(58) Field of Classification Search
CPC ... G06F 16/2237; G06F 16/278; G06F 16/284
(Continued)

(56) References Cited

U.S. PATENT DOCUMENTS 6,067,540 A * 5/2000 Ozbutun ............... G06F 16/30
6,081,800 A 6/2000 Ozbutun et al.
(Continued)

FOREIGN PATENT DOCUMENTS

CN 102110146 A 6/2011
CN 102254012 A 11/2011
(Continued)

OTHER PUBLICATIONS

Zolmeister, "Use Bitmap Indexes for tags to improve performance," Oct. 2015, Retrieved from the internet: https://github.com/influxdata/influxdb/issues/4311, total 2 pages.
(Continued)

*Primary Examiner* — Hung T Vy
(74) *Attorney, Agent, or Firm* — Conley Rose, P.C.

(57) ABSTRACT

A data storage method includes obtaining at least one data record, each data record includes one carrier identifier and at least one label value, the at least one data record is stored in a data table, and the data table is used to record a correspondence between a carrier identifier and a label value; and creating a bitmap index corresponding to the at least one data record, where the bitmap index includes at least one bitmap; each bitmap corresponds to one label value; each bitmap includes at least one bitmap position, and each bitmap position is used to record whether a carrier corresponding to one carrier identifier has a label value corresponding to a current bitmap.

21 Claims, 3 Drawing Sheets

(58) Field of Classification Search
 USPC .......................................................... 707/745
 See application file for complete search history.

(56) References Cited

U.S. PATENT DOCUMENTS

| | | | |
|---|---|---|---|
| 6,195,656 B1 | 2/2001 | Ozbutun et al. | |
| 6,216,125 B1 | 4/2001 | Johnson | |
| 6,658,405 B1 | 12/2003 | Ozbutun | |
| 7,171,427 B2 * | 1/2007 | Witkowski | G06F 16/2264 |
| 9,489,410 B1 | 11/2016 | Turner et al. | |
| 2005/0050077 A1 * | 3/2005 | Li | G06F 16/2465 |
| 2007/0050381 A1 | 3/2007 | Hu et al. | |
| 2009/0089362 A1 * | 4/2009 | Zhong | H04L 12/66 |
| | | | 709/202 |
| 2016/0350775 A1 | 12/2016 | Turner et al. | |

FOREIGN PATENT DOCUMENTS

| | | |
|---|---|---|
| CN | 102779180 A | 11/2012 |
| CN | 105630972 A | 6/2016 |
| CN | 106682042 A | 5/2017 |

OTHER PUBLICATIONS

Lucien, "Analysis of Dynamic Loading Technology of Linux Kernel Module LKM," Retrieved from the internet: https://blog.csdn.net/lucien_cc/article/details/7959076, Sep. 8, 2012, 29 pages.
U.S. CCILearningSolutionsInc, "Microsoft Office Access 2007 Professional Certification Course", China Railway Press, Feb. 2011, with an English Introduction, 6 pages.

* cited by examiner

DATA STORAGE METHOD AND APPARATUS, AND STORAGE MEDIUM

CROSS-REFERENCE TO RELATED APPLICATIONS

This is a continuation of Int'l Patent App. No. PCT/CN2017/095893 filed on Aug. 3, 2017, which is incorporated by reference.

TECHNICAL FIELD

This application relates to the field of information processing technologies, and in particular, to a data storage method and apparatus, and a storage medium.

BACKGROUND

A Hadoop database (HBase) is a distributed database and features high reliability, high performance, KeyValue based storage, and the like. Therefore, the HBase is used by a growing quantity of enterprises and users to create a data table.

Generally, a data table includes a plurality of rows of data records, and each row of data records includes an identifier of a carrier and label values of labels of the carrier. For example, if a user A has two label values: a gender "female" and an occupation "engineer", a row corresponding to the user A in the data table includes an identifier, the label value "female", and the label value "engineer" of the user A. In other words, in a related technology, a correspondence between an identifier of a carrier and a label value of the carrier is recorded in a data table.

In a storage manner based on a data table, when a data query needs to be performed in the data table, query efficiency is high when the data query is performed based on an identifier of a carrier. However, when a query is performed based on a label value or a combination of label values, in a related technology, label values of carriers can be queried for row by row only based on identifiers of the carriers by using a row value filter. In addition, there are usually thousands of rows in the data table. Therefore, in a related solution, when a data query is performed based on a label value, data query efficiency is relatively low.

SUMMARY

To resolve a problem of low data query efficiency in a related technology, embodiments of this application provide a data storage method and apparatus, and a storage medium. The technical solutions are as follows:

According to a first aspect, a data storage method is provided. The data storage method includes: obtaining at least one data record, where each data record includes one carrier identifier and at least one label value; the at least one data record may be stored in a data table; and the data table is used to record a correspondence between a carrier identifier and a label value; and after the obtaining at least one data record, creating a bitmap index corresponding to the at least one data record, where the bitmap index includes at least one bitmap; each bitmap corresponds to one label value; each bitmap includes at least one bitmap position; and each bitmap position is used to record whether a carrier corresponding to one carrier identifier has a label value corresponding to a current bitmap. For example, if a carrier has a label value corresponding to a current bitmap, a bitmap position corresponding to the carrier may be set to "1"; otherwise, if a carrier does not have a label value corresponding to a current bitmap, a bitmap position corresponding to the carrier may be set to "0". A bitmap position is a corresponding position of each carrier identifier in a bitmap.

After the at least one data record is obtained, the bitmap index corresponding to the at least one data record is created, and the bitmap index includes a correspondence between a label value and a bitmap corresponding to the label value, where the bitmap includes at least one bitmap position used to record whether a carrier corresponding to a carrier identifier has a corresponding label value, so that when a query is performed based on the label value subsequently, corresponding data can be directly determined based on the bitmap index. This improves data query efficiency.

In a first possible implementation of the first aspect, before the obtaining at least one data record, a label definition table may be further preset, where the preset label definition table includes a plurality of preset label values. Usually, the label definition table is a definition table preset and stored by a designer, and the label definition table includes all label values that are possibly included in the data table.

Correspondingly, the step of obtaining at least one data record may include: generating the data table based on to-be-stored source data and the preset label definition table.

The label definition table is preset, so that when the to-be-stored source data is stored, a label value in the source data can be determined based on label values defined in the label definition table, to generate the data table.

With reference to the first possible implementation, in a second possible implementation, during actual implementation, the label definition table may further include label configuration information; and the label configuration information further includes information used to indicate whether the bitmap corresponding to each label value is resident in memory. Optionally, one piece of corresponding label configuration information may be set for each label value; and the label configuration information is used to indicate whether the bitmap corresponding to the label value is resident in the memory. A bitmap corresponding to a label value corresponding to information used to indicate residence in the memory in the label configuration information may be loaded to the memory. In an implementation, only label configuration information used to indicate a need of residence in the memory may be included, or only label configuration information used to indicate no need of residence in the memory may be included, or both may be included.

Generally, a label value corresponding to a bitmap that needs to be resident in the memory is a label value in a hot query, that is, usually a label value whose query frequency is higher than a preset threshold. Therefore, a bitmap corresponding to such a type of label value is resident in the memory, so that when a data query is performed subsequently, data corresponding to the label value is directly found based on the bitmap in the memory. This improves data query efficiency.

With reference to the first aspect, the first possible implementation of the first aspect, or the second possible implementation of the first aspect, in a third possible implementation, the bitmap index may be divided into a plurality of bitmap index partitions, where each bitmap index partition may include at least one sub bitmap; each bitmap index partition corresponds to one carrier identifier set; and there is no intersection set between carrier identifier sets corresponding to different bitmap index partitions. Each sub bitmap in the bitmap index partition corresponds to one label value.

The bitmap index is stored in the plurality of bitmap index partitions in a distributed manner, avoiding a problem that a quantity of data that can be stored is limited due to a limitation of storage space.

With reference to the first aspect, the first possible implementation of the first aspect, or the second possible implementation of the first aspect, in a fourth possible implementation, similar to the bitmap index, the data table may be divided into a plurality of data partitions, and further, the data table is stored in the plurality of data partitions in a distributed manner. Optionally, the data table may be divided into M data partitions based on a first range of carrier identifiers, where each data partition includes at least one sub data table; a carrier identifier range corresponding to each data partition is the first range; and there is no intersection set between carrier identifier sets corresponding to different data partitions. When the data table is divided into the M data partitions, for the bitmap index partition described above, N bitmap index partitions may be determined based on the M data partitions. A difference from the third possible implementation lies in that, in this implementation, a carrier identifier range corresponding to each bitmap index partition is greater than or equal to the first range, and there is no intersection set between carrier identifier sets corresponding to different bitmap index partitions. M and N are positive integers, N is less than or equal to M, and N is greater than or equal to 2.

In this implementation, the bitmap index partition is determined based on the data partition. During actual implementation, the bitmap index partition may be obtained through partitioning according to a preset partitioning manner. This is not limited herein.

The bitmap index and the data table are both divided into partitions, and then stored in a distributed manner, avoiding a problem that a quantity of data that can be stored is limited due to a limitation of storage space.

With reference to the third possible implementation or the fourth possible implementation, in a fifth possible implementation, a quantity of sub bitmaps in each bitmap index partition described above is a quantity of all label values that are set in a predefined label definition table. For example, if there are 10 label values in total in the label definition table, a total quantity of sub bitmaps in each bitmap index partition is also 10. For a label value in the label definition table, if none of carriers corresponding to carrier identifiers that belong to a bitmap index partition has the label value, content of a bitmap corresponding to the label value indicates that the label value does not exist.

The bitmap corresponding to each label value in the label definition table is set in each bitmap index partition, so that when a query is performed based on a label value, corresponding data can be determined based on a bitmap index corresponding to the label value. This improves data query efficiency.

With reference to the third possible implementation, the fourth possible implementation, or the fifth possible implementation, in a sixth possible implementation, same bitmap positions in different bitmaps in the bitmap index correspond to a same carrier identifier; same bitmap positions in different sub bitmaps in each bitmap index partition correspond to a same carrier identifier; and same bitmap positions in different sub bitmaps in different bitmap index partitions correspond to different carrier identifiers.

A correspondence between a bitmap position in the bitmap index or the bitmap index partition and a carrier identifier is set, so that when a data query is performed based on the bitmap index or the bitmap index partition, a corresponding carrier identifier can be rapidly found, and corresponding data can be further found. This improves data query efficiency.

With reference to the third possible implementation, the fourth possible implementation, the fifth possible implementation, or the sixth possible implementation of the first aspect, in a seventh possible implementation, when a user needs to perform a query based on a label value, a data query request may be sent; and correspondingly, after the data query request is received, a data query is performed. In other words, the data storage method further includes: receiving a data query request, where the data query request carries at least one target label value; separately determining, in the plurality of bitmap index partitions, at least one target sub bitmap corresponding to the at least one target label value, and separately determining an identifier of a target carrier corresponding to a target bitmap position included in each of the at least one target sub bitmap; querying the data table for a label value of the target carrier; and feeding back the label value of the target carrier.

When a data query is performed based on a label value, the target sub bitmap corresponding to the target label value can be directly queried for based on the previously created bitmap index, to find the label value of the target carrier. This resolves a problem of low data query efficiency when a data query is performed based on a column value filter in a related technology, and can improve the data query efficiency.

With reference to any one of the first aspect or the foregoing possible implementations of the first aspect, in an eighth possible implementation, when a terminal needs to store new data, a server may correspondingly obtain the new data. A carrier identifier and/or a label value in a new correspondence included in the new data is new. That is, the new data may be data obtained after a label value in stored data is updated, or may be data that has not been stored before.

After the new data is obtained, the bitmap index may be updated based on the new correspondence.

The bitmap index is updated after the new data is obtained, so that after the data query request is received, required data can be found based on the newest bitmap index. This improves data query efficiency.

With reference to the eighth possible implementation, in a ninth possible implementation, the step of updating the bitmap index based on the new correspondence described above may include: determining a bitmap index partition to which the carrier identifier in the new correspondence belongs; and in the determined bitmap index partition, updating the label value in the new correspondence, and/or updating a bitmap corresponding to the label value in the new correspondence.

According to a second aspect, a data storage apparatus is provided. The data storage apparatus includes a storage and a processor, where the storage stores an instruction; and the data storage apparatus (which may be a computer device such as a server) executes the instruction, for example, a processor in the data storage apparatus executes the instruction, so that the data storage apparatus implements the data storage method according to the first aspect.

According to a third aspect, a data storage apparatus is provided. The apparatus includes at least one unit, where the at least one unit is configured to implement the data storage method provided according to the first aspect.

According to a fourth aspect, a computer readable storage medium is provided. The computer readable storage medium stores an instruction; and a data storage apparatus (which may be a computer device such as a server) executes the instruction, for example, a processor in the data storage apparatus executes the instruction, so that the data storage apparatus implements the data storage method provided according to the first aspect.

DESCRIPTION OF EMBODIMENTS

Figure 1:
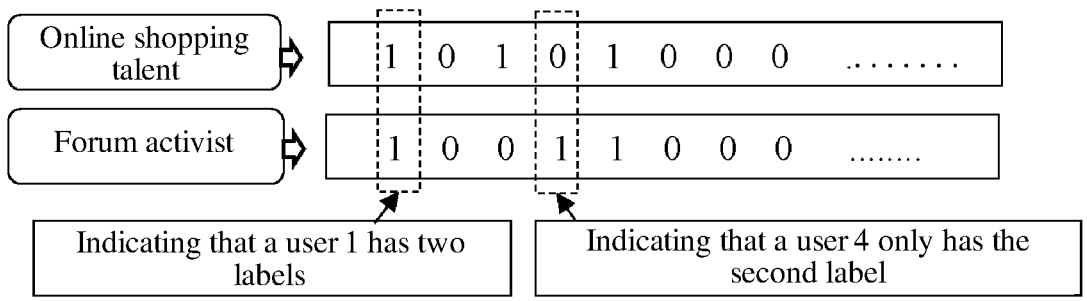
FIG. 1 is a schematic diagram of a bitmap index in embodiments of this application.

For ease of understanding, related terms in the following embodiments are briefly described first.

A label is a content organization manner, and is used to represent a feature of data, to help people describe and classify content. For example, common labels include a gender, an education background, an occupation, a color, and the like. Optionally, a label is artificially specified.

In a possible implementation, labels may include two types: an enumeration label and a Boolean label. The enumeration label is a label including a plurality of enumerated values. For example, an education background includes a college degree, a bachelor degree, a graduate degree, or a doctor degree. For another example, a gender includes male or female. The Boolean label is only used to indicate whether the label exists, for example, having a house or not, having a drug addiction or not, or having a criminal record or not.

When a label is an enumeration label, a label value of the label is a specific value of the label. For example, assuming that the label is an education background, when the education background is a bachelor degree, a label value is the bachelor degree; or when the education background is a graduate degree, a label value is the graduate degree. When a label is a Boolean label, a label value of the label is the label itself. For example, when a user has a house, a label value of the label is having a house. For another example, when a user has no criminal record, a corresponding label value of the label is no criminal record.

A carrier is an object described by each label. Optionally, the carrier may be a person, a vehicle, a telephone number, a virtual user account, or the like. One carrier may have one label or may have a plurality of labels. For example, assuming that a carrier is a person, labels for describing the person may include a gender, an education background, having a house or not, having a criminal record or not, and the like. For another example, assuming that a carrier is a vehicle, labels for describing the vehicle may include a color, having a violation record or not, and the like.

A data table includes a data record created in a database by using a carrier as an index. Each data record in the data table records an identifier of one carrier, records all label values of the carrier, and records a correspondence between the identifier of the carrier and the label value of the carrier.

A bitmap index is a level 2 index that is created in a database by using a label value in a data table as an index. Optionally, the bitmap index records a label value and a bitmap, and also records a one-to-one correspondence between the label value and the bitmap. Each bitmap position in the bitmap corresponds to one carrier identifier, but different bitmap positions in the bitmap correspond to different carrier identifiers, that is, there is a one-to-one correspondence between all bitmap positions in the bitmap and all carrier identifiers. Each bitmap position in the bitmap records whether a carrier corresponding to one carrier identifier has a label value corresponding to a current bitmap (a bitmap of the bitmap position). For example, if a bitmap position in a bitmap of a label value is 1, it indicates that a carrier corresponding to the bitmap position has the label value; otherwise, if the bitmap position is 0, it indicates that the carrier corresponding to the bitmap position does not have the label value. Same bitmap positions in different bitmaps correspond to a same carrier identifier.

For example, a carrier is a virtual user account. It is assumed that there are eight virtual user accounts in total, and the virtual user accounts are a user1, a user2, . . . , and a user8. A set having a label value "online shopping talent" consists of the user1, the user4, and the user8; and a set having a label value "forum activist" consists of the user1, the user2, and the user8. Bitmap positions that are allocated to the eight virtual user accounts in a bitmap are sequentially 1, 2, 3, . . . , and 8, as shown in FIG. 1. A bitmap corresponding to the label value "online shopping talent" is "10010001"; and a bitmap corresponding to the label value "forum activist" includes 11000001. Using the bitmap "10010001" corresponding to "online shopping talent" as an example, the first "1" in the bitmap indicates that a virtual user account whose bitmap position is 1 is an online shopping talent; similarly, the second "1" in the bitmap indicates that a virtual user account whose bitmap position is 4 is also an online shopping talent; and the third "1" in the bitmap indicates that a virtual user account whose bitmap position is 8 is also an online shopping talent. The meaning of the bitmap "11000001" corresponding to the label value "forum activist" is similar to this. It may be learned from FIG. 1 that, the user1 and the user8 both have the two label values: "online shopping talent" and "forum activist".

Figure 2:
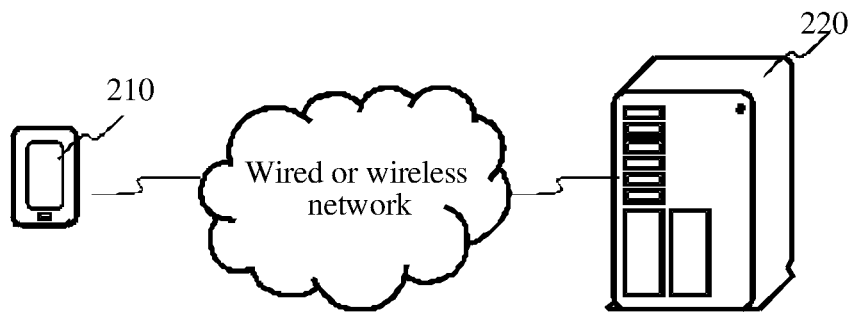
FIG. 2 is a schematic diagram of an implementation environment of embodiments of this application.

Referring to FIG. 2, FIG. 2 is a schematic diagram of an implementation environment of embodiments of this application. As shown in FIG. 2, the implementation environment includes a terminal 210 and a server 220.

A client used to request data storage or a data query is installed in the terminal 210. Optionally, the client may be a browser. In a possible implementation, the terminal 210 may be a device such as a mobile phone, a tablet computer, an e-reader, or a desktop computer. The terminal 210 may be connected to the server 220 by using a wired or wireless network.

The server 220 may be one or more servers. Optionally, a plurality of servers may provide a database service for the terminal 210 in a form of a server cluster. In a possible implementation, a database is set in the server 220, and the database may be a distributed database such as an HBase, a Mongo database (MongoDB), a distributed relational database service (DRDS), a Volt database (VoltDB), or a ScaleBase.

A method for generating a data table is described below.

Figure 3:
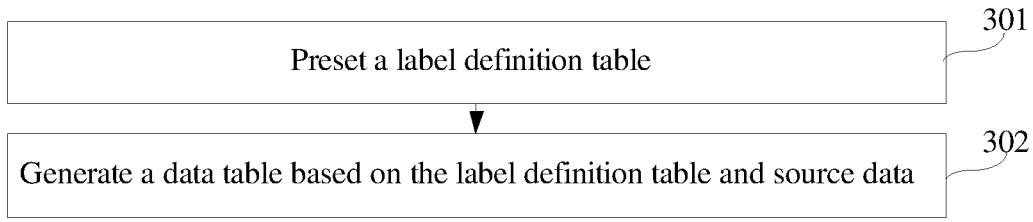
FIG. 3 is a flowchart of a method for generating a data table according to an embodiment of this application.

Referring to FIG. 3, FIG. 3 is a flowchart of a method for generating a data table according to an embodiment of this application. In this embodiment, an example in which the data storage method is applied to the server shown in FIG. 2 is used for description. As shown in FIG. 3, the data storage method includes step 301 and step 302.

Step 301: Preset a label definition table.

The label definition table may be information pre-obtained and stored by the server. Optionally, the label definition table may be stored in a form of an independent file, for example, stored in a form of an Extensible Markup Language (XML) file, or may be stored in a third-party distributed storage system, for example, stored in a Zoo-Keeper.

A plurality of preset label values are recorded in the label definition table. In an optional presetting manner, a label value included in a label is set based on historical data, or a label value included in a label is artificially defined.

Table 1 shows a possible label definition table. Certainly, Table 1 may include more or fewer labels. This is not limited.

TABLE 1

| Label | Label Value | Label Configuration Information |
|---|---|---|
| Gender | Male, female | Resident in memory |
| Education background | College degree, bachelor degree, graduate degree, doctor degree | Not resident in memory |
| Occupation | Student, teacher, self-employed entrepreneur, enterprise member | Resident in memory |
| Online shopping enthusiast | Online shopping enthusiast | Resident in memory |
| Drug abuser | Drug abuser | Not resident in memory |

Optionally, as shown in Table 1, the label definition table may further include label configuration information. The label configuration information includes information indicating whether a label value needs to be resident in memory, information indicating whether a bitmap corresponding to a label value that needs to be resident in the memory also needs to be resident in the memory, and information indicating whether a bitmap corresponding to a label value that does not need to be resident in the memory does not need to be resident in the memory either.

In Table 1, an identifier "resident in memory" is set for a label value that needs to be resident in the memory, and an identifier "not resident in memory" is set for a label value that does not need to be resident in the memory. It should be understood that, the identifier "resident in memory" may be set for a label value that needs to be resident in the memory, and no identifier may be set for a label value that does not need to be resident in the memory. That the identifier "not resident in memory" is set for the label value that does not need to be resident in the memory in Table 1 is merely an example.

A database is stored in a storage medium (for example, a hard disk) of the server. During initial use of the database, a label value and a bitmap corresponding to the label value are loaded to the memory, and the bitmap in the memory is synchronously updated with a bitmap in the storage medium, so that during each query for the label value, the bitmap of the label value in the memory can be directly used, without a need of accessing the bitmap in the storage medium, thereby improving query efficiency and reducing a query time.

Optionally, the label definition table may further include a life cycle of each label value. The life cycle is a time period during which the label value is valid. In other words, the label value is invalid in another time that does not fall within the life cycle.

Optionally, the server may allocate one label number to each label value in Table 1. When a mapping relationship between a label value and a bitmap is stored, the label value may be replaced by a label number. Compared with storage of the label value, storage of the label number can save storage space. In addition, herein, a corresponding label value can be found based on a label number, and a corresponding label number can be found based on a label value.

Step 302: A server generates a data table based on the label definition table and source data.

The server first obtains to-be-stored source data. In an optional implementation, the server receives a data storage request sent by a terminal. The data storage request carries the to-be-stored source data. In another optional implementation, the server may proactively obtain the source data from a terminal, or the server obtains the source data from a database storing the source data. Therefore, in this embodiment of the present application, how the server obtains the source data is not limited.

There may be one or more pieces of to-be-stored source data. Optionally, referring to Table 2, a plurality of pieces of source data may exist in a form of a table. Each row of the table indicates one piece of source data, and each piece of source data has a unique carrier identifier.

TABLE 2

| Carrier Identifier | |
|---|---|
| A01 | Gender: male; education background: bachelor degree; occupation: student |
| A02 | Gender: female; education background: college degree; occupation: self-employed entrepreneur; online shopping talent |
| B01 | Gender: male; education background: college degree; occupation: enterprise member |
| B02 | Gender: female; education background: bachelor degree; occupation: student |
| C01 | Gender: male; education background: graduate degree |
| C02 | Gender: female; education background: college degree; occupation: enterprise member; online shopping talent |
| D01 | Gender: male; education background: graduate degree; occupation: enterprise member; online shopping talent |
| D02 | Gender: female; education background: bachelor degree; occupation: student |
| D03 | Gender: male; education background: college degree; occupation: enterprise member |
| E01 | Gender: male; education background: graduate degree; occupation: self-employed entrepreneur; drug abuser |
| E02 | Gender: female; education background: college degree; occupation: self-employed entrepreneur |
| E03 | Gender: male; education background: bachelor degree; occupation: student |
| F01 | Gender: male; education background: graduate degree; occupation: teacher |
| F02 | Gender: female; education background: college degree; occupation: enterprise member; online shopping talent |
| F03 | Gender: male; education background: bachelor degree; occupation: student |
| F04 | Gender: female; education background: graduate degree; occupation: self-employed entrepreneur; drug abuser |
| . . . | . . . |

After the server obtains the source data, the server may determine all label values of each piece of source data based on the label definition table. For example, for the source data shown in Table 2, Table 3 shows a label value of each piece of source data that is determined by the server based on Table 1. Content in each [ ] in Table 3 indicates one label value.

TABLE 3

| Carrier Identifier | Label Value |
| --- | --- |
| A01 | [Gender: male]; [education background: bachelor degree]; and [occupation: student] |
| A02 | [Gender: female]; [education background: college degree]; [occupation: self-employed entrepreneur]; and [online shopping talent] |
| B01 | [Gender: male]; [education background: college degree]; and [occupation: enterprise member] |
| B02 | [Gender: female]; [education background: bachelor degree]; and [occupation: student] |
| C01 | [Gender: male]; and [education background: graduate degree] |
| C02 | [Gender: female]; [education background: college degree]; [occupation: enterprise member]; and [online shopping talent] |
| D01 | [Gender: male]; [education background: graduate degree]; [occupation: enterprise member]; and [online shopping talent] |
| D02 | [Gender: female]; [education background: bachelor degree]; and [occupation: student] |
| D03 | [Gender: male]; [education background: college degree]; and [occupation: enterprise member] |
| E01 | [Gender: male]; [education background: graduate degree]; [occupation: self-employed entrepreneur]; and [drug abuser] |
| E02 | [Gender: female]; [education background: college degree]; and [occupation: self-employed entrepreneur] |
| E03 | [Gender: male]; [education background: bachelor degree]; and [occupation: student] |
| F01 | [Gender: male]; [education background: graduate degree]; and [occupation: teacher] |
| F02 | [Gender: female]; [education background: college degree]; [occupation: self-employed entrepreneur]; and [online shopping talent] |
| F03 | [Gender: male]; [education background: college degree]; and [occupation: enterprise member] |
| F04 | [Gender: female]; [education background: bachelor degree]; and [occupation: student] |
| . . . | . . . |

Referring to the data table shown in Table 3, the data table includes a plurality of data records. Each data record includes one carrier identifier. For example, the first data record includes the identifier A01, and the ninth data record includes the identifier D03. Each data record further includes a label value corresponding to the carrier identifier. For example, the first data record includes the label values "[gender: male]; [education background: bachelor degree]; and [occupation: student]" corresponding to the identifier A01. For another example, the ninth data record includes the label values "[gender: male]; [education background: college degree]; and [occupation: enterprise member]" corresponding to the identifier D03. As shown in Table 3, each data record in the data table includes a correspondence between an identifier of one carrier and all label values of the carrier. For example, the first data record in the data table includes a correspondence between the identifier A01 and the label values "[gender: male]; [education background: bachelor degree]; and [occupation: student]".

For the data table, all label values corresponding to an identifier of a carrier in the data table may be queried for based on the carrier identifier, that is, all label values of the carrier are found.

Optionally, the data table may be divided into a plurality of data partitions, and the plurality of data partitions of the data table are stored in a distributed manner. An optional manner of obtaining a data partition through division may be obtaining a data partition through division by specifying a quantity of data partitions, or may be directly defining a partition interval of each data partition.

For example, the following partition intervals are set for the data table:
    a data partition 1: [, A);
    a data partition 2: [, B);
    a data partition 3: [B, C);
    a data partition 4: [C, D);
    a data partition 5: [D, E);
    a data partition 6: [E, F);
    . . . .

Table 3 is divided based on the foregoing partition intervals, to obtain data partitions shown in Table 4.

TABLE 4

| Data Partition | Carrier Identifier | Label Value |
| --- | --- | --- |
| Data partition 1 | A01 | [Gender: male]; [education background: bachelor degree]; and [occupation: student] |
| | A02 | [Gender: female]; [education background: college degree]; [occupation: self-employed entrepreneur]; and [online shopping talent] |
| Data partition 2 | B01 | [Gender: male]; [education background: college degree]; and [occupation: enterprise member] |
| | B02 | [Gender: female]; [education background: bachelor degree]; and [occupation: student] |
| Data partition 3 | C01 | [Gender: male]; and [education background: graduate degree] |
| | C02 | [Gender: female]; [education background: college degree]; [occupation: enterprise member]; and [online shopping talent] |
| Data partition 4 | D01 | [Gender: male]; [education background: graduate degree]; [occupation: enterprise member]; and [online shopping talent] |
| | D02 | [Gender: female]; [education background: bachelor degree]; and [occupation: student] |
| | D03 | [Gender: male]; [education background: college degree]; and [occupation: enterprise member] |
| Data partition 5 | E01 | [Gender: male]; [education background: graduate degree]; [occupation: self-employed entrepreneur]; and [drug abuser] |
| | E02 | [Gender: female]; [education background: college degree]; and [occupation: self-employed entrepreneur] |
| | E03 | [Gender: male]; [education background: bachelor degree]; and [occupation: student] |
| Data partition 6 | F01 | [Gender: male]; [education background: graduate degree]; and [occupation: teacher] |
| | F02 | [Gender: female]; [education background: college degree]; [occupation: self-employed entrepreneur]; and [online shopping talent] |
| | F03 | [Gender: male]; [education background: college degree]; and [occupation: enterprise member] |
| | F04 | [Gender: female]; [education background: bachelor degree]; and [occupation: student] |
| . . . | . . . | . . . |

Each data partition of the data table may be automatically split or extended. For example, data (for example, carrier identifiers or label values) in a data partition is increasing over time. When a data quantity in the data partition reaches a splitting threshold, the server may split the data partition into two data partitions, to avoid that new data cannot continue to be written into the data partition after storage space of the data partition is full.

Each data partition includes at least one sub data table. Using the data partition 1 in Table 4 as an example, if the data partition 1 has one sub data table, the sub data table includes the first data record (including the identifier A01 and a data label corresponding to the identifier A01), and the second data record (including the identifier A02 and a data label corresponding to an identifier A03). Certainly, the data partition 1 may include two sub data tables, where the first data record is recorded in one sub data table, and the second data record is recorded in the other sub data table.

There is no intersection set between carrier identifier sets corresponding to sub data tables in the data partitions. Using Table 4 as an example, a carrier identifier set corresponding to a sub data table in the data partition 1 is the interval [, B), a carrier identifier set corresponding to a sub data table in the data partition 2 is the interval [B, C), and there is no intersection set between the set corresponding to the sub data table in the data partition 1, namely the interval [, B), and the set corresponding to the sub data table in the data partition 2, namely the interval [B, C). By analogy, there is no intersection set between all sets corresponding to sub data tables in the different data partitions 1 in Table 4.

Update of the data table is described below.

(1) Update a Label Value.

If an identifier of a target carrier is already stored in the data table, the server updates, by using an updated-to label value, a label value corresponding to the identifier of the target carrier. Updating the label value may include adding a label value or deleting a label value.

For example, in Table 4, the data record of the identifier A01 has three label values: "[gender: male]; [education background: bachelor degree]; and [occupation: student]". Referring to Table 5, if a label value "[online shopping talent]" is added to the data record of the identifier A01, after label value update is performed, the data record of the identifier A01 has four label values: "[gender: male]; [education background: bachelor degree]; [occupation: student]; and [online shopping talent]". Referring to Table 6, if the label value "[occupation: student]" in the data record of the identifier A01 is expected to be deleted, after label value update is performed, the data record of the identifier A01 has two label values: "[gender: male]; and [education background: bachelor degree]".

TABLE 5

| Partition | Carrier Identifier | Label Value |
| --- | --- | --- |
| Data partition 1 | A01 | [Gender: male]; [education background: bachelor degree]; [occupation: student]; and [online shopping talent] |
| | A02 | [Gender: female]; [education background: college degree]; [occupation: self-employed entrepreneur]; and [online shopping talent] |

TABLE 6

| Partition | Carrier Identifier | Label Value |
| --- | --- | --- |
| Data partition 1 | A01 | [Gender: male]; and [education background: bachelor degree] |
| | A02 | [Gender: female]; [education background: college degree]; [occupation: self-employed entrepreneur]; and [online shopping talent] |

In the foregoing examples, only a single label value in a data record is updated. Certainly, a plurality of label values in a data record may be updated at the same time, or label values in a plurality of data records may be updated at the same time. Details are not described herein.

(2) Add a Carrier.

The server adds a data record to the data table, which includes adding a target carrier identifier, and adding all label values of the target carrier identifier to the data table at the same time.

For example, a data record of an identifier A03 is added to Table 4. Referring to Table 7, specifically, in a column of Carrier Identifier in the data partition 1, the identifier A03 is recorded in a next row of the identifier A02; and correspondingly, label values "[gender: female]; [education background: college degree]; [occupation: enterprise member]; and [online shopping talent]" corresponding to the identifier A03 are recorded in the column of Label Value.

TABLE 7

| Data Partition | Carrier Identifier | Label Value |
| --- | --- | --- |
| Data partition 1 | A01 | [Gender: male]; [education background: bachelor degree]; and [occupation: student] |
| | A02 | [Gender: female]; [education background: college degree]; [occupation: self-employed entrepreneur]; and [online shopping talent] |
| | A03 | [Gender: female]; [education background: college degree]; [occupation: enterprise member]; and [online shopping talent] |

In the foregoing example, only the data record of the identifier A03 is added. Certainly, the server may add a plurality of data records to the data partition 1, or may separately add a plurality of data records to a plurality of data partitions. Details are not described herein.

In addition, the server may delete a data record from the data partition of the data table, which includes deleting an identifier of a carrier and deleting a label value of the carrier. For example, when the data record of the identifier A02 is deleted, the identifier A02 is deleted, and the label values "[gender: female]; [education background: college degree]; [occupation: self-employed entrepreneur]; and [online shopping talent]" corresponding to the identifier A02 are deleted.

A method for generating a bitmap index is described below.

The server may allocate one bitmap position in the bitmap to each carrier identifier, that is, the bitmap position is a corresponding position of each carrier identifier in the bitmap. Referring to an example of bitmap position allocation shown in Table 8, for a carrier of the identifier A01, a bitmap position allocated to the carrier is 1; for a carrier of the identifier A02, a bitmap position allocated to the carrier is 2; and the rest is deduced by analogy.

TABLE 8

| Carrier Identifier | Bitmap Position |
| --- | --- |
| A01 | 1 |
| A02 | 2 |
| B01 | 3 |
| B02 | 4 |
| C01 | 5 |
| C02 | 6 |
| D01 | 7 |
| D02 | 8 |
| D03 | 9 |
| E01 | 10 |
| E02 | 11 |
| E03 | 12 |
| F01 | 13 |
| F02 | 14 |
| F03 | 15 |
| F04 | 16 |
| . . . | . . . |

Figure 4:
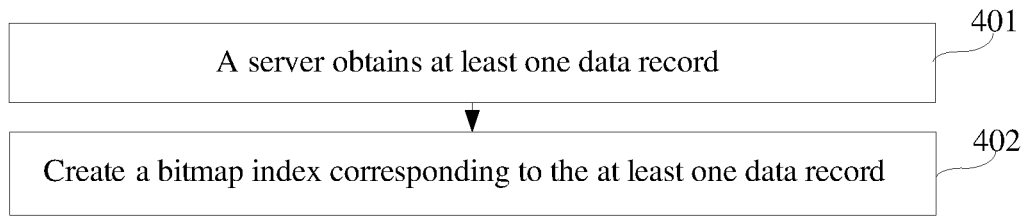
FIG. 4 is a flowchart of a method for creating a bitmap index according to an embodiment of this application.

Referring to FIG. 4, FIG. 4 is a flowchart of a method for creating a bitmap index according to an embodiment of this application. In this embodiment, for example, the data storage method is applied to the server shown in FIG. 2. As shown in FIG. 4, the data storage method includes step 401 and step 402.

Step 401: The server obtains at least one data record.

The at least one data record is stored in a data table. The data record includes an identifier of one carrier and at least one label value. In each piece of data in the data table, an identifier of one carrier is recorded, and all label values of the carrier are recorded. For detailed descriptions of the data table and the data record, refer to related descriptions in which Table 3 or Table 4 is used as an example. Details are not described herein again.

Step 402: The server creates a bitmap index corresponding to the at least one data record.

The data table has at least one data record, and the server creates one bitmap for each data record. Therefore, the bitmap index includes at least one bitmap, and each data record corresponds to one bitmap in the bitmap index.

Each bitmap corresponds to one label value, and each bitmap includes at least one bitmap position. Each bitmap position records whether a carrier corresponding to a carrier identifier has a label value corresponding to a current bitmap (a bitmap of the bitmap position), and same bitmap positions in different bitmaps in the bitmap index correspond to a same carrier identifier. For descriptions of a structure of the bitmap index, refer to related descriptions of the bitmap index above. Details are not described herein again.

For example, a bitmap index shown in Table 9 is obtained based on the data table shown in Table 3 or Table 4 and based on the correspondence between a carrier identifier and a bitmap position shown in Table 8. In the bitmap index shown in Table 9, a label value "drug abuser" corresponds to one bitmap "[0000000001000000 . . . ]"; and the 10th bitmap position in the bitmap is "1", indicating that a carrier of the identifier E01 has the label value "drug abuser". In the bitmap index shown in Table 9, a label value "online shopping talent" corresponds to one bitmap "[0100011000000100 . . . ]"; and the 10th bitmap position in the bitmap is "0", indicating that the carrier of the identifier E01 does not have the label value "online shopping talent".

TABLE 9

| Label Value | Bitmap |
| --- | --- |
| Gender: male | [1010101011011010 . . .] |
| Gender: female | [0101010100100101 . . .] |
| Education background: college degree | [0110010010100100 . . .] |
| Education background: bachelor degree | [1001000100010010 . . .] |
| . . . | . . . |
| Online shopping talent | [0100011000000100 . . .] |
| Drug abuser | [0000000001000000 . . .] |
| . . . | . . . |

Optionally, a bitmap position being "1" in the bitmap is indicated by using an array. For example, in the bitmap index shown in Table 9, the label value "drug abuser" corresponds to one bitmap "[0000000001000000 . . . ]", and the bitmap may be indicated as an array [10]"; and the label value "online shopping talent" corresponds to one bitmap "[0100011000000100 . . . ]", and the bitmap may be indicated as an array [2 6 7 14]. The array in replacement of the bitmap is stored in a database, so that storage space can be saved. Optionally, the bitmap is still stored in memory. In this way, during a label value query, an operation (for example, an AND operation or an OR operation) may be performed on a target bitmap based on a bitmap position, to determine a target bitmap position.

Optionally, a bitmap position having a relatively small ratio in the bitmap is indicated by using an array. For example, in the bitmap index shown in Table 9, the label value "drug abuser" corresponds to one bitmap "[0000000001000000 . . . ]", and a ratio of "1" in the bitmap is relatively small, so the bitmap may be indicated as an array including "1", namely [10]; the label value "online shopping talent" corresponds to one bitmap "[0100011000000100 . . . ]", and a ratio of "1" in the bitmap is relatively small, so the bitmap may be indicated as an array including "1", namely [2 6 7 14]. The array in replacement of the bitmap is stored in a database, so that storage space can be saved. Optionally, the bitmap is still stored in memory. In this way, during a label value query, an operation (for example, an AND operation or an OR operation) may be performed on a target bitmap based on a bitmap position, to determine a target bitmap position.

Figure 5:
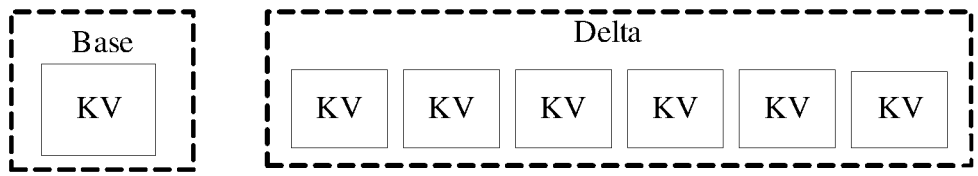
FIG. 5 is a schematic diagram of storage of a bitmap index in an underlying database according to an embodiment of this application.

Optionally, a structure shown in Table 9 is a storage structure of the bitmap index in the memory, and the bitmap index is stored in the database by using Base+Delta. Base is specific content of the bitmap index, and an actual storage structure of Base is similar to the storage structure in the memory. If a ratio of an index having a label value or having no label value in the bitmap is lower than a preset ratio, such a type of index may be indicated by using an array; otherwise, bit-based storage is performed. Referring to FIG. 5, Delta includes at least one KeyValue, each KeyValue corresponds to a change operation of changing content of the bitmap, and the change operation includes an operation of updating content of a position, for example, Delta includes "changing the 10th position in the bitmap to 1" and "changing the 15th position in the bitmap to 0"; or the change operation includes an operation of adding preset content to a position, for example, includes "adding 1 to the 21st position in the bitmap". Optionally, when a data size of Base reaches a first size, Base and Delta are combined, and Base obtained after the combination is a storage path of a file obtained after the combination, and the file obtained after the combination is stored in Delta obtained after the combination. Certainly, in a possible implementation, the bitmap index may be stored in the database in a form of a file. This is not limited.

Optionally, during initial use of the database, a label value that needs to be resident in the memory is loaded based on the label configuration information in the label definition table in Table 1, and a bitmap corresponding to the label value that needs to be resident in the memory is loaded. The bitmap in the memory is synchronously updated with a bitmap in a storage medium, so that during each query for the label value, the bitmap of the label value in the memory can be directly used, without a need of accessing the bitmap in the storage medium, thereby improving query efficiency and reducing a query time.

In the data storage method provided in this embodiment of the present application, the bitmap index may be divided into a plurality of bitmap index partitions.

Division of the bitmap index into a plurality of bitmap index partitions is similar to division of the data table into data partitions. For a manner of obtaining the bitmap index partition through division, refer to a manner of obtaining through division the data partition. For example, Table 10 shows a division result of bitmap index partitions, where a bitmap index partition 1 is an interval [, E), a bitmap index partition 2 is an interval [E, G), and the rest is deduced by analogy. In each bitmap index partition, a bitmap position of each carrier identifier is unique. In different bitmap index partitions, same bitmap positions correspond to different carrier identifiers.

TABLE 10

| Bitmap Index Partition | Carrier Identifier | Bitmap Position |
| --- | --- | --- |
| Bitmap index partition 1 | A01 | 1 |
|  | A02 | 2 |
|  | B01 | 3 |
|  | B02 | 4 |
|  | C01 | 5 |
|  | C02 | 6 |
|  | DOI | 7 |
|  | D02 | 8 |
|  | D03 | 9 |
| Bitmap index partition 2 | E01 | 1 |
|  | E02 | 2 |
|  | E03 | 3 |
|  | F01 | 4 |
|  | F02 | 5 |
|  | F03 | 6 |
|  | F04 | 7 |
| ... | ... | ... |

Optionally, an interval corresponding to each bitmap index partition is preset by a user, and the server obtains the bitmap index partition through division based on the preset interval. For example, three non-overlapping intervals: [, E), [E, G), and [G,) are preset, and the bitmap index partition 1 and the bitmap index partition 2 that are shown in the bitmap Table 10, and a bitmap index partition 3 (not shown) are obtained through division based on the three intervals.

Optionally, the server may associate M data partitions with N bitmap index partitions, where M and N are positive integers, N is less than or equal to M, and N is greater than or equal to 2. Each of the M data partitions belongs to a unique bitmap index partition, and each of the N bitmap index partitions includes at least one data partition.

After a bitmap index partition is determined, a bitmap index partition to which a carrier identifier in the data table belongs is also determined. Correspondingly, one bitmap index partition has one sub bitmap index in the bitmap index; the sub bitmap index includes all sub bitmaps corresponding to all carrier identifiers corresponding to the bitmap index partition; and each sub bitmap includes bitmap positions corresponding to all the carrier identifiers. By analogy, each bitmap index partition includes at least one sub bitmap.

Table 11 shows an example of the bitmap index after the bitmap index is divided into the bitmap index partitions. Using the bitmap index partition 1 as an example, the bitmap index partition 1 corresponds to one sub bitmap index; the sub bitmap index includes a plurality of sub bitmaps, for example, a sub bitmap "[101010101]" corresponding to the label value "gender: male"; and the sub bitmap includes the first nine bitmap positions (that is, the first bitmap position to the ninth bitmap position) in the bitmap "[1010101011011010 . . . ]" corresponding to "gender: male" in Table 9. By analogy, a sub bitmap corresponding to each label value in the bitmap index partition 1 is obtained.

TABLE 11

| Partition | Label Value | Sub Bitmap |
| --- | --- | --- |
| Bitmap index partition 1 | Gender: male | [101010101] |
|  | Gender: female | [010101010] |

TABLE 11-continued

| Partition | Label Value | Sub Bitmap |
| --- | --- | --- |
|  | Education background: college degree | [011001001] |
|  | Education background: bachelor degree | [100100010] |
|  | ... | ... |
|  | Online shopping talent | [010001100] |
|  | Drug abuser | [000000000] |
| Bitmap index partition 2 | Gender: male | [1011010] |
|  | Gender: female | [0100101] |
|  | Education background: college degree | [0100100] |
|  | Education background: bachelor degree | [0010010] |
|  | ... | ... |
|  | Online shopping talent | [0000100] |
|  | Drug abuser | [1000000] |
|  | ... |  |

It should be noted that, for the bitmap index partition 2 in Table 11, a correspondence between each bitmap position in the bitmap index partition 2 and a carrier identifier is different from the correspondence between each bitmap position and a carrier identifier in Table 9. For example, the first bitmap position in each sub bitmap in the bitmap index partition 2 shown in Table 11 corresponds to the carrier identifier E01, but the tenth bitmap position in the bitmap in the bitmap index shown in Table 9 corresponds to the carrier identifier E01.

In addition, similar to the bitmap in Table 9, the sub bitmap in the bitmap index partition shown in Table 11 also records a correspondence between a label value and a bitmap position (corresponding to a carrier identifier), and a difference lies in that a quantity of bitmap positions recorded in the bitmap in Table 9 is greater than a quantity of bitmap positions recorded in the sub bitmap shown in Table 11.

It may be learned from the foregoing analysis that, same bitmap positions in different bitmaps in the bitmap index correspond to a same carrier identifier; same bitmap positions in different sub bitmaps in each bitmap index partition correspond to a same carrier identifier; and same bitmap positions in different sub bitmaps in different bitmap index partitions correspond to different carrier identifiers.

Optionally, carrier identifier sets corresponding to sub bitmaps in each bitmap index partition are independent of each other, and there is no intersection set. For example, in Table 10 and Table 11, a carrier identifier set corresponding to the bitmap index partition 1 is the interval [, E); a carrier identifier set corresponding to the bitmap index partition 2 is the interval [E, G); and there is no intersection set between the interval [, E) and the interval [E, G). More specifically, each carrier identifier belongs to a unique set (that is, an interval). Therefore, a bitmap position corresponding to the carrier identifier also uniquely belongs to a bitmap index partition corresponding to the set. For example, the carrier identifier F04 belongs to the interval [E, G), and the interval [E, G) corresponds to the bitmap index partition 2, so a bitmap position of the carrier identifier F04 is in the bitmap index partition 2, that is, all sub bitmaps including the bitmap position of the carrier identifier F04 are in the bitmap index partition 2.

Optionally, a carrier identifier set corresponding to a sub bitmap in each bitmap index partition is greater than or equal to a first range, and the first range is a carrier identifier set corresponding to a sub data table in a data partition. Specifically, each bitmap index partition includes the at least one data partition, and each data partition of the data table belongs to a unique bitmap index partition. Therefore, a first range (that is, a carrier identifier set corresponding to a sub data table in the data partition) of each data partition is less than or equal to an identifier set corresponding to an index partition to which the data partition belongs (that is, a carrier identifier set corresponding to a sub bitmap of the index partition).

Optionally, in each bitmap index partition, one sub bitmap is created for each of all label values in the label definition table. Specifically, regardless of whether a carrier in a sub bitmap index has a label value, one sub bitmap is created for the label value in the sub bitmap index. For example, in Table 11, none of carriers in the bitmap index partition 1 has the label value "drug abuser", but in a sub bitmap index in the bitmap index partition 1, a sub bitmap "[000000000]" is still created for the label value "drug abuser". In this way, if a carrier in the bitmap index partition 1 is subsequently updated to have the label value "drug abuser", the sub bitmap "[000000000]" is directly updated, without a need of adding or creating a sub bitmap corresponding to the label value "drug abuser". Compared with adding a sub bitmap, changing only a bitmap position in a sub bitmap requires no additional storage resources, so that the bitmap index partition 1 is prevented from being split due to an increase in a data quantity.

For example, once a storage capacity of a bitmap index partition is determined, if a required storage capacity is greatly increased due to an increase in a quantity of sub bitmaps in the bitmap index partition, when a preset storage capacity threshold is reached, new data cannot be stored in the bitmap index partition, and the bitmap index partition needs to be split.

In addition, using Table 11 as an example, even if a new carrier is added to the bitmap index partition 1 and the carrier has the label value "drug abuser", a relatively small quantity of storage resources, for example, one bit, is occupied for adding a bitmap position to a sub bitmap for an identifier of the carrier. Therefore, usually, the bitmap index partition 1 is not split when a bitmap position is added because of addition of a carrier.

One sub bitmap is created for each of all the label values in the label definition table in each bitmap index partition. Therefore, a quantity of sub bitmaps in each bitmap index partition is a quantity of all labels in the label definition table. For example, assuming that the total quantity of label values that are set in the label definition table is 10, after the sub bitmap is created for each of all the label values in the label definition table in each bitmap index partition, the quantity of sub bitmaps in each bitmap index partition is also 10.

Optionally, all the bitmap index partitions in the bitmap index need to be recreated due to extension or splitting of the bitmap index partition. Consequently, costs are relatively high. In this embodiment, the server disables splitting or extension of the bitmap index partition.

However, the capacity of the bitmap index partition continuously increases or changes over time. For example, in a big data scenario, a quantity of carriers is increasing, or a sub bitmap is correspondingly added to each bitmap index partition because a label value is added to the label definition table, or label values of a large quantity of carriers are invalid. Therefore, to avoid that newly added data cannot be stored in the bitmap index partition due to an insufficient storage capacity, the server may recreate the bitmap index partition. Optionally, the server may read, in a distributed manner based on a MapReduce mechanism, a data record stored in the data table, obtain an updated bitmap index partition, and recreate a sub bitmap index in each bitmap index partition based on the updated bitmap index partition. Specifically, the server may reallocate a bitmap position to a carrier in each bitmap index partition, and generate, based on the allocated bitmap position, a sub bitmap corresponding to each label value.

A method for updating the bitmap index is described below.

The server stores new data, where the new data may be a data record, and a carrier identifier and/or a label value in a correspondence included in the new data is new; and the server updates the bitmap index based on the new correspondence.

The step of updating the bitmap index based on the new correspondence includes the following steps.

First step: Determine a bitmap index partition to which the carrier identifier in the new correspondence belongs.

Referring to the foregoing descriptions of a carrier identifier set corresponding to a sub bitmap in the bitmap index partition, because each carrier identifier uniquely belongs to one bitmap index partition, the bitmap index partition to which the carrier identifier in the new correspondence belongs may be determined.

For example, with reference to Table 10, if the carrier identifier in the new correspondence is F03, it may be determined that the bitmap index partition to which the carrier identifier belongs is the bitmap index partition 2; or if the carrier identifier in the new correspondence is B02, it may be determined that the bitmap index partition to which the carrier identifier belongs is the bitmap index partition 1.

Second step: In the determined bitmap index partition, update the label value in the new correspondence, and/or update a bitmap corresponding to the label value in the new correspondence.

(1) Update a Label Value.

If an identifier of a target carrier in the new data is already stored in the data table, a sub bitmap corresponding to the updated label value in the determined bitmap index partition is updated.

Optionally, if the carrier has the label value before the update but does not have the label value after the update, the server updates, in the determined bitmap index partition, a bitmap position corresponding to the carrier identifier in the sub bitmap of the label value from "1" to "0". For example, if the bitmap position corresponding to the carrier identifier in the sub bitmap is 3, and the sub bitmap is 1011 before the update, the sub bitmap is 1001 after the update. If the carrier does not have the label value before the update but has the label value after the update, the server updates, in the determined bitmap index partition, a bitmap position corresponding to the carrier identifier in the sub bitmap of the label value from "0" to "1". For example, if the bitmap position corresponding to the carrier identifier in the sub bitmap is 5, and the sub bitmap is 10110 before the update, the sub bitmap is 10111 after the update.

Optionally, a bitmap position being "1" in the sub bitmap is indicated by using an array. If the carrier does not have the label value before the update but has the label value after the update, the server adds the bitmap position of the carrier identifier to an array of the label value in the determined bitmap index partition. For example, if the bitmap position corresponding to the carrier identifier in the sub bitmap is 3, and an initial sub bitmap corresponding to the original label value is (1, 7), the updated sub bitmap is (1, 3, 7). If the carrier has the label value before the update but does not have the label value after the update, the server deletes, from the determined bitmap index, the bitmap position corresponding to the carrier identifier in the array of the label value. For example, if a bitmap position corresponding to source data in the sub bitmap is 3, and an initial sub bitmap corresponding to the original label value is (1, 3, 7), the updated sub bitmap is (1, 7). Similarly, if a bitmap position being "0" is indicated by using an array, the server may update content of the sub bitmap by using a similar update method. Details are not described herein again.

Optionally, in a specific case, if a label value in the new data is not a label value predefined in the label definition table, the server adds a sub bitmap corresponding to the newly added label value to the determined bitmap index partition. A bitmap position, in the newly added sub bitmap, of each piece of data that belongs to the bitmap index partition is the same as a bitmap position in another sub bitmap in the bitmap index partition.

(2) Update a Carrier.

If an identifier of a carrier is added to the new data (for example, a new data record in the data table), in the determined bitmap index partition, a bitmap position is allocated to the carrier, and the sub bitmap is updated based on all label values of the carrier identifier in the new data.

Optionally, for the sub bitmap corresponding to each label value in the determined bitmap index partition, if the carrier in the new data has the label value, information used to indicate that the label value exists is added to an allocated bitmap position in the sub bitmap. For example, if the bitmap position allocated to the carrier in the new data is 5, and an initial sub bitmap corresponding to a label value is 0101, the updated sub bitmap is 01011. If the carrier in the new data does not have the label value, information used to indicate that the label value does not exist is added to an allocated bitmap position in the sub bitmap. An example is used for description. Still referring to the example that the bitmap position allocated to the carrier in the new data is 5, if an initial sub bitmap corresponding to a label value is 0101, the updated sub bitmap is 01010.

Optionally, if a bitmap position being "1" in bitmap positions is indicated by using an array, for the sub bitmap corresponding to each label value in the determined bitmap index partition, if the carrier in the new data has the label value, a newly allocated bitmap position is added to the sub bitmap. For example, if a bitmap position allocated to the carrier in the new data is 5, and the carrier has a label value, an initial sub bitmap corresponding to the label value is (3). Similarly, if a bitmap position being "0" in bitmap positions is indicated by using an array, the server may perform update by using a similar method. Details are not described herein again.

Optionally, if the bitmap index is not divided into index partitions, the server directly updates the bitmap index based on the new correspondence. A specific update method thereof is similar to that in the foregoing descriptions, and a difference lies in that, when the bitmap index is divided into index partitions, the bitmap index partition to which the carrier identifier in the new data belongs needs to be determined first, and then update is performed; but herein, update is directly performed without a need of determining the bitmap index partition. Details are not described herein.

Figure 6:
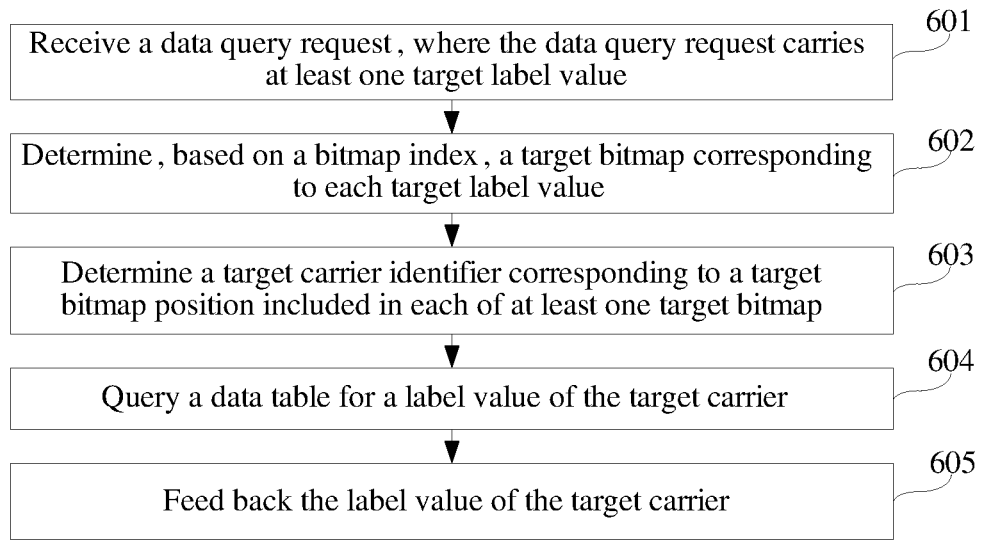
FIG. 6 and FIG. 7 are method flowcharts of a data query method according to an embodiment of this application.

Referring to FIG. 6, FIG. 6 is a method flowchart of a data query method according to an embodiment of this application. In this embodiment, for example, the data query method is applied to the server shown in FIG. 2. As shown in FIG. 6, the data query method includes the following steps.

Step 601: Receive a data query request, where the data query request carries at least one target label value.

When the terminal needs to query for data having a label value, a terminal may send a data query request to the server. Correspondingly, the server may receive the data query request. The data query request carries at least one target label value that needs to be queried for.

Optionally, when the terminal needs to query for data having a label value A, the terminal may send, to the server, a data query request carrying the label value A; or when the terminal needs to query for data not having a label value A, the terminal may send, to the server, a data query request carrying "not A".

Optionally, when the data query request carries at least two target label values, an "AND" relationship, an "OR" relationship, or a "NOT" relationship may exist between the at least two target label values.

For example, when the terminal needs to query for data having both a label value A and a label value B, the terminal may send, to the server, a data query request carrying "A and B". For another example, when the terminal needs to query for data having a label value A or a label value B, the terminal may send, to the server, a data query request carrying "A or B". For still another example, when needing to query for data having a label value A not a label value B, the terminal may send, to the server, a data query request carrying "A not B".

Step 602: Determine, based on a bitmap index, a target bitmap corresponding to each target label value.

The bitmap index includes at least one bitmap; each bitmap corresponds to one label value; each bitmap includes at least one bitmap position; each bitmap position is used to record whether a carrier corresponding to one carrier identifier has a label value corresponding to a current bitmap; same bitmap positions in different bitmaps correspond to a same carrier identifier; and the bitmap index is an index corresponding to a data table. The bitmap index is the index created in the foregoing embodiment. For specific implementation of the bitmap index, refer to the foregoing embodiment. Details are not described herein again.

After receiving the data query request, the server extracts the target label value from the data query request, and then queries the bitmap index, to extract the target bitmap corresponding to each target label value.

Optionally, if there are at least two target label values, the server may query for, based on the bitmap index, a target bitmap corresponding to each target label value. For example, if the target label values carried in the data query request include "A and B", the server may query for a target bitmap 1 corresponding to the label value A and a target bitmap 2 corresponding to the label value B.

Optionally, if label configuration information used to indicate whether a bitmap corresponding to a label value is resident in memory is preset, after receiving the data query request, the server may determine, based on label configuration information corresponding to the target label value, whether the bitmap corresponding to the target label value is resident in the memory; and if the bitmap is resident in the memory, determine the target bitmap corresponding to the target label value in the memory; or if the bitmap is not resident in the memory, load, to the memory from a database, the bitmap corresponding to the target label value.

Step 603: Determine a target carrier identifier corresponding to a target bitmap position included in each of at least one target bitmap.

If there is one target label value, and the data query request is used to query for data having the target label value, the server determines, based on the target bitmap, a bitmap position corresponding to the data that needs to be queried for. In addition, because there is a one-to-one correspondence between each bitmap position and a carrier identifier, a carrier identifier corresponding to the found bitmap position may be determined based on the foregoing correspondence. The found carrier identifier is the target carrier identifier.

For example, assuming that the target bitmap determined in step 802 is "01100001", the server may determine, based on the target bitmap, that obtained bitmap positions are 2, 3, and 8, and further determine that a carrier identifier corresponding to the bitmap position being 2 is an identifier 2, a carrier identifier corresponding to the bitmap position being 3 is an identifier 3, and a carrier identifier corresponding to the bitmap position being 8 is an identifier 8.

If there is one target label value, and the data query request is used to query for data not having the target label value, the server may determine data that is in the target bitmap and that corresponds to an index used to indicate that the target label value does not exist. This is similar to the foregoing determining step. Details are not described herein again. Optionally, in a possible implementation, the server may perform a NOT operation on the target bitmap, and then calculate a carrier identifier corresponding to the bitmap position being 1.

If there are at least two target label values, and the data query request is used to query for data including both the at least two target label values, in step 602, the server may determine at least two target bitmaps. In this case, when the bitmap is a binary sequence, the server may perform an AND operation on the at least two determined target bitmaps, determine a bitmap position whose value is 1 after the AND operation, and then query for a carrier identifier corresponding to the determined bitmap position. For example, assuming that the target label values include A and B, the data query request is used to query data having both the label value A and the label value B, and the server obtains through query that a bitmap corresponding to the label value A is "01100001" and a bitmap corresponding to the label value B is "01001011", the server obtains "01000001" after performing the AND operation. In this case, the server may determine carrier identifiers corresponding to the bitmap positions being 2 and 8.

If there are at least two target label values, and the data query request is used to query for data having j first target label values or data having k second target label values, when the bitmap is a binary sequence, the server may perform an AND operation on j target bitmaps corresponding to the j first target label values, perform an AND operation on k target bitmaps corresponding to the k second target label values, perform an OR operation on results obtained after the AND operations thereof, and determine a carrier identifier corresponding to a bitmap position being "1" that is obtained after the OR operation, where j and k are integers greater than or equal to 1. In addition, when j or k is 1, the AND operation described above may be not performed, or it may be considered that a result obtained after the AND operation is the target bitmap itself.

If there are at least two target label values, and the data query request is used to query for data having x third target label values and not having y fourth target label values, the server may perform an AND operation on x target bitmaps corresponding to the x third target label values to obtain a first result, perform an AND operation on y target bitmaps corresponding to the y fourth target label values to obtain a second result, perform a NOT operation on the first result and the second result, and determine a carrier identifier corresponding to a bitmap position being 1 that is obtained after the NOT operation, where x and y are integers greater than or equal to 1. In addition, when x or y is 1, the AND operation described above may be not performed, or it may be considered that a result obtained after the AND operation is the target bitmap itself.

It should be noted that, when the bitmap is an array, query logic of the bitmap is similar to that in the foregoing descriptions. Details are not described herein again.

Step 604: Query a data table for a label value of a target carrier.

The data table records a correspondence between at least one carrier identifier in stored data and at least one label value of the data. Optionally, a structure of the data table is similar to the structure described in the foregoing embodiment. Details are not described herein again.

After the target carrier identifier is determined in step 603, the server may query for, based on the foregoing correspondence recorded in the data table, the at least one label value corresponding to the target carrier identifier.

Step 605: Feed back the label value of the target carrier.

Optionally, the server feeds back the found label value to the terminal.

In conclusion, according to the data query method provided in this embodiment, after the data query request is received, the data that needs to be queried for can be directly determined based on the bitmap index. This resolves a problem of relatively low data query efficiency in a related technology, and improves the data query efficiency.

In addition, during a multi-label query, the query is directly performed based on index information in memory, so that the multi-label query can be made at an ms level.

It should be noted that, in a possible implementation, if the bitmap index is divided into a plurality of bitmap index partitions, for example, N bitmap index partitions, where N is an integer greater than or equal to 2, step 602 and step 603 in the foregoing embodiment are adaptively changed. Therefore, in the following embodiment, a data query method used when a bitmap index partition of the bitmap is stored is described in detail. Each bitmap index partition includes the at least one sub bitmap, and there is no intersection set between carrier identifier sets corresponding to sub bitmaps in each bitmap index partition. This is similar to the bitmap index partition in data storage described above. Details are not described herein again.

Figure 7:
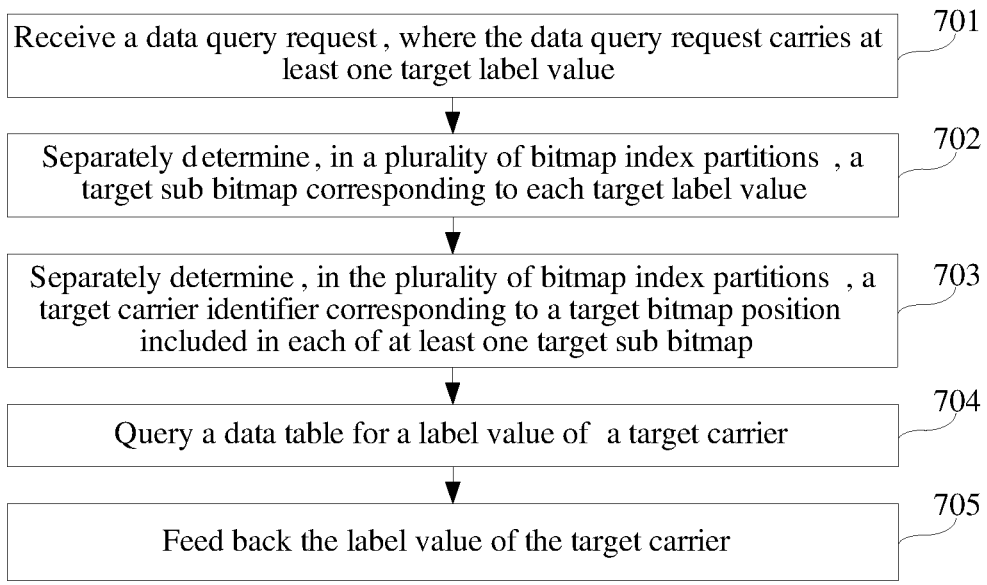

Referring to FIG. 7, FIG. 7 is a method flowchart of a data query method according to an embodiment of this application. In this embodiment, for example, the data query method is applied to the server shown in FIG. 2. As shown in FIG. 7, the data query method includes the following steps.

Step 701: Receive a data query request, where the data query request carries at least one target label value.

Step 702: Determine, in a plurality of bitmap index partitions, a target sub bitmap corresponding to each target label value.

When a bitmap index is stored in N bitmap index partitions, for each bitmap index partition, the server may query for the target sub bitmap corresponding to the target label value in the bitmap index partition. For example, assuming that the bitmap index is stored in four bitmap index partitions, the server may query a bitmap index partition 1 for a target sub bitmap 1 corresponding to the target label value, query a bitmap index partition 2 for a target sub bitmap 2 corresponding to the target label value, query a bitmap index partition 3 for a target sub bitmap 3 corresponding to the target label value, and query a bitmap index partition 4 for a target sub bitmap 4 corresponding to the target label value.

Optionally, when the data query request carries at least two target label values, for each bitmap index partition, the server may query for a target sub bitmap index corresponding to each target label value in the bitmap index partition. For example, it is assumed that the target label values carried in the data query request include a target label value 1, a target label value 2, and a target label value 3. For example, when a query is made in a bitmap index partition 1, the server may query the bitmap index partition 1 for a target sub bitmap 1 corresponding to the target label value 1, a target sub bitmap 2 corresponding to the target label value 2, and a target sub bitmap 3 corresponding to the target label value 3.

Step 703: Separately determine, in the plurality of bitmap index partitions, a target carrier identifier corresponding to a target bitmap position included in each of at least one target sub bitmap.

After determining the at least one target sub bitmap in each bitmap index partition, the server may determine, in each bitmap index partition, the target bitmap position based on the at least one determined target sub bitmap, and determine a carrier identifier corresponding to the target bitmap position. Each carrier identifier determined in each bitmap index partition is a final target carrier identifier.

Specific determining manners of determining the target bitmap position in each bitmap index partition and determining the target carrier identifier are similar to determining manners of determining the target bitmap position in the bitmap index and determining the target carrier identifier in the foregoing embodiment. Details are not described herein again.

Step 704: Query a data table for a label value of a target carrier.

Step 705: Feed back the label value of the target carrier.

Specific implementation of step 704 and step 705 is similar to specific implementation of step 604 and step 605 in the foregoing embodiment. Details are not described herein again.

In conclusion, according to the data query method provided in this embodiment, after the data query request is received, the data that needs to be queried for can be directly determined based on the bitmap index. This resolves a problem of relatively low data query efficiency in a related technology, and improves the data query efficiency.

In addition, during a multi-label query, the query is directly performed based on index information in memory, so that the multi-label query can be made at an ms level.

Figure 8:
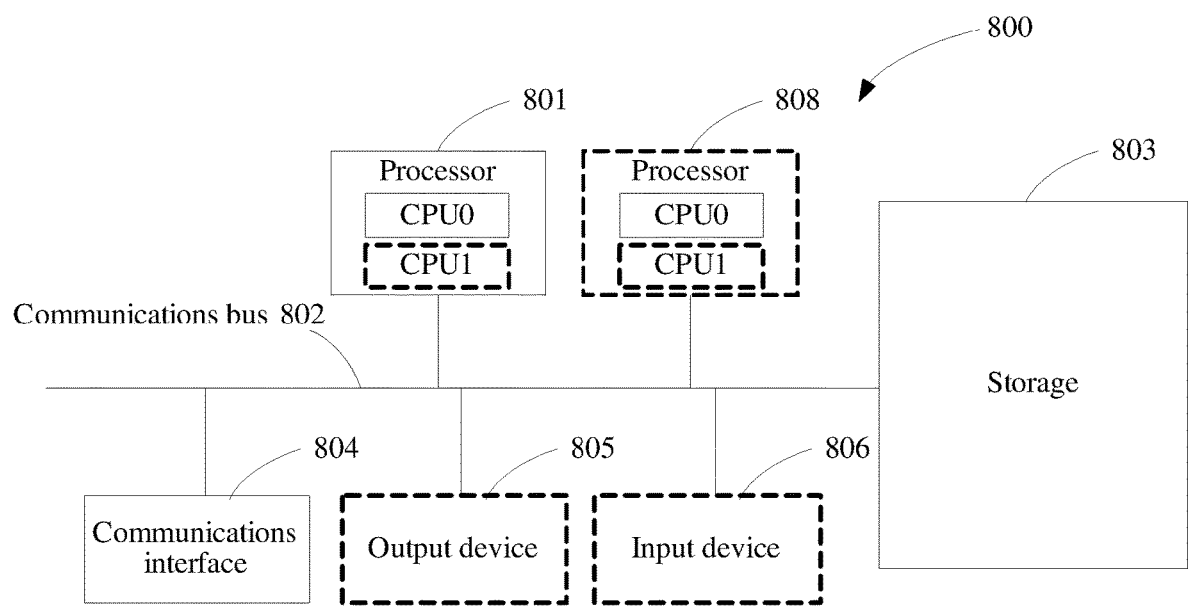
FIG. 8 and FIG. 9 are schematic diagrams of a data storage apparatus according to an embodiment of this application.

FIG. 8 is a schematic diagram of a data storage apparatus according to an embodiment of the present application. The data storage apparatus 800 may be a computer device. The computer device may be the foregoing server (for example, the server 220 shown in FIG. 2). The data storage apparatus 800 includes at least one processor 801, a communications bus 802, a storage 803, and at least one communications interface 804.

The processor 801 may be a general central processing unit (CPU), a microprocessor, an application-specific integrated circuit (ASIC), or one or more integrated circuits configured to control execution of a program in the solutions of the present application.

The communications bus 802 may include a path for transmitting information between the foregoing components. The communications interface 804 is a type of apparatus that uses any transceiver, and is configured to communicate with other devices or communications networks such as Ethernet, a radio access network (RAN), and a wireless local area network (WLAN).

The memory 803 may be a read-only memory (ROM) or another type of static storage device that can store static information and a static instruction, or a random-access memory (RAM) or another type of dynamic storage device that can store information and an instruction, or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, and the like), magnetic disk storage medium, another magnetic storage device, or any other medium that can be configured to carry or store desired program code in a form of an instruction or a data structure and that is accessible to a computer, but is not limited thereto. The storage may independently exist and be connected to the processor by using the bus. Alternatively, the storage may be integrated with the processor.

The storage 803 is configured to store program code in the solutions of the present application, and the processor 801 controls execution of the program code. The processor 801 is configured to execute the program code stored in the storage 803.

During specific implementation, in an embodiment, the processor 801 may include one or more CPUs, for example, a CPU0 and a CPU1 in FIG. 8.

During specific implementation, in an embodiment, the data storage apparatus 800 may include a plurality of processors, for example, the processor 801 and a processor 808 in FIG. 8. Each of these processors may be a single-core (single-CPU) processor, or may be a multi-core (multi-CPU) processor. Herein the processor may be one or more devices, circuits, and/or processing cores used to process data (for example, a computer program instruction).

During specific implementation, in an embodiment, the data storage apparatus 800 may further include an output device 805 and an input device 806. The output device 805 communicates with the processor 801, and can display information in a plurality of manners. For example, the output device 805 may be a liquid crystal display (LCD), a light-emitting diode (LED) display device, a cathode ray tube (CRT) display device, or a projector. The input device 806 communicates with the processor 801, and can accept input of a user in a plurality of manners. For example, the input device 806 may be a mouse, a keyboard, a touchscreen device, or a sensor device.

The data storage apparatus 800 may be a general computer device or a dedicated computer device. During specific implementation, the data storage apparatus 800 may be a desktop computer, a portable computer, a network server, a personal digital assistant (PDA), a mobile phone, a tablet computer, a wireless terminal device, a communications device, an embedded device, or a device having a similar structure in FIG. 8. A type of the data storage apparatus 800 is not limited in this embodiment of the present application.

One or more software modules are stored in the storage of the data storage apparatus. The data storage apparatus may implement the software module by using the processor and the program code in the storage, to implement the data storage method described the foregoing embodiments.

Figure 9:
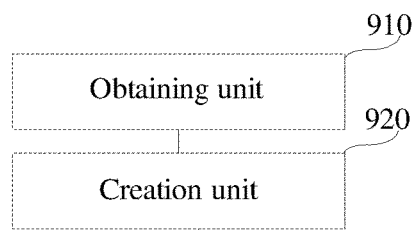

Referring to FIG. 9, FIG. 9 is a schematic structural diagram of a data storage apparatus according to an embodiment of this application. As shown in FIG. 9, the data storage apparatus may include an obtaining unit 910 and a creation unit 920.

The obtaining unit 910 is configured to perform step 401 in the foregoing embodiment.

The creation unit 920 is configured to perform step 402 in the foregoing embodiment.

Optionally, the data storage apparatus may further include a setting unit.

The setting unit is configured to perform step 301 in the foregoing embodiment.

The obtaining unit 910 is further configured to perform step 302 in the foregoing embodiment.

Optionally, the label definition table further includes label configuration information; the label configuration information includes information used to indicate whether a bitmap corresponding to each label value is resident in memory; and the data storage apparatus may further include a loading unit.

The loading unit is configured to load, to the memory based on the label configuration information, a bitmap that needs to be resident in the memory.

Optionally, the apparatus further includes a division unit.

The division unit is configured to divide a bitmap index into a plurality of bitmap index partitions, where each bitmap index partition includes at least one sub bitmap; each bitmap index partition corresponds to one carrier identifier set; and there is no intersection set between carrier identifier sets corresponding to different bitmap index partitions.

Optionally, the apparatus further includes a division unit and a determining unit.

The division unit is configured to divide a data table into M data partitions based on a first range of carrier identifiers, where each data partition includes at least one sub data table; a carrier identifier set corresponding to each data partition is the first range; and there is no intersection set between carrier identifier sets corresponding to different data partitions.

The determining unit is configured to determine N bitmap index partitions based on the M data partitions, where each bitmap index partition includes at least one sub bitmap; a carrier identifier range corresponding to each bitmap index partition is greater than or equal to the first range; and there is no intersection set between carrier identifier sets corresponding to different bitmap index partitions, where M and N are positive integers, N is less than or equal to M, and N is greater than or equal to 2.

Optionally, a quantity of sub bitmaps in each bitmap index partition is a quantity of all label values that are set in a predefined label definition table.

Optionally, same bitmap positions in different bitmaps in the bitmap index correspond to a same carrier identifier; same bitmap positions in different sub bitmaps in each bitmap index partition correspond to a same carrier identifier; and same bitmap positions in different sub bitmaps in different bitmap index partitions correspond to different carrier identifiers.

Optionally, the apparatus further includes a receiving unit, a determining unit, a query unit, and a feedback unit.

The receiving unit is configured to perform step 601 or step 701 in the foregoing embodiments.

The determining unit is configured to perform step 602 and step 703 in the foregoing embodiments.

The query unit is configured to perform step 604 or step 704 in the foregoing embodiments.

The feedback unit is configured to perform step 605 or step 705 in the foregoing embodiments.

Optionally, the obtaining unit 910 is further configured to obtain new data, where a carrier identifier and/or a label value in a new correspondence included in the new data is new.

The apparatus further includes an update unit. The update unit is configured to update the bitmap index based on the new correspondence.

Optionally, the update unit is further configured to: determine a bitmap index partition to which the carrier identifier in the new correspondence belongs; and in the determined bitmap index partition, update the label value in the new correspondence, and/or update a bitmap corresponding to the label value in the new correspondence.

In conclusion, after obtaining at least one data record, the data storage apparatus provided in this embodiment creates a bitmap index corresponding to the at least one data record; where the bitmap index includes a correspondence between a label value and a bitmap corresponding to the label value, and the bitmap includes at least one bitmap position used to record whether a carrier corresponding to a carrier identifier has a corresponding label value, so that when a query is performed based on the label value subsequently, corresponding data can be directly determined based on the bitmap index. This improves data query efficiency.

An embodiment of this application further provides a computer storage medium. The computer storage medium stores an instruction; and a data storage apparatus (which may be a computer device such as a server) executes the instruction, for example, a processor in the data storage apparatus executes the instruction, so that the data storage apparatus implements the data storage method in the foregoing embodiment.

An embodiment of this application provides a computer program product. The computer program product includes an instruction; and a data storage apparatus (which may be a computer device such as a server) executes the instruction, so that the data storage apparatus performs the data storage method in the foregoing method embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data storage method comprising:
   obtaining at least one data record from a data table, wherein each data record comprises one carrier identifier and at least one label value which corresponds to the carrier identifier;
   creating a bitmap index corresponding to the at least one data record, wherein the bitmap index comprises at least one bitmap, wherein each bitmap corresponds to one label value and comprises at least one bitmap position, and wherein each bitmap position in a bitmap of the at least one bitmap records whether a carrier corresponding to one carrier identifier has a label value corresponding to the bitmap; and
   dividing the data table into M data partitions based on a first range of carrier identifiers, wherein each data partition comprises at least one sub-data table, wherein a carrier identifier set corresponding to each data partition is the first range, and wherein there is no intersection set between carrier identifier sets corresponding to different data partitions; and
   determining N bitmap index partitions based on the M data partitions, wherein each bitmap index partition comprises at least one sub-bitmap, wherein a carrier identifier range corresponding to each bitmap index partition is greater than or equal to the first range, wherein there is no intersection set between carrier identifier sets corresponding to different bitmap index partitions, wherein M and N are positive integers, wherein N is less than or equal to M, and wherein N is greater than or equal to 2.

2. The data storage method of claim 1, wherein before obtaining at least one data record, the data storage method further comprises:
presetting a label definition table comprising a plurality of preset label values; and
generating the data table based on to-be-stored source data and the label definition table.

3. The data storage method of claim 2, wherein the label definition table further comprises label configuration information, wherein the label configuration information indicates that the bitmap resides in a memory, and wherein the data storage method further comprises loading, to the memory based on the label configuration information, the bitmap.

4. The data storage method of claim 1, further comprising:
obtaining new data, wherein a carrier identifier or a label value in a new correspondence comprised in the new data is new; and
updating the bitmap index based on the new correspondence.

5. The data storage method of claim 4, further comprising:
determining a bitmap index partition to which the carrier identifier in the new correspondence belongs; and
updating, in the bitmap index partition, the label value in the new correspondence or updating a bitmap corresponding to the label value in the new correspondence.

6. The data storage method of claim 1, further comprising dividing the bitmap index into a plurality of bitmap index partitions, wherein each bitmap index partition comprises at least one sub-bitmap and corresponds to a carrier identifier set, and wherein there is no intersection set between carrier identifier sets corresponding to different bitmap index partitions.

7. The data storage method of claim 6, wherein same bitmap positions in different bitmaps in the bitmap index correspond to a same carrier identifier, wherein same bitmap positions in different sub-bitmaps in each bitmap index partition correspond to a same carrier identifier, and wherein same bitmap positions in different sub-bitmaps in different bitmap index partitions correspond to different carrier identifiers.

8. The data storage method of claim 6, further comprising:
receiving a data query request comprising at least one target label value;
determining, from the bitmap index partitions, at least one target sub-bitmap corresponding to the at least one target label value;
determining an identifier of a target carrier corresponding to a target bitmap position comprised in each of the at least one target sub-bitmap;
querying the data table for a label value of the target carrier; and
feeding back the label value of the target carrier.

9. A data storage apparatus comprising:
a storage configured to store a program code; and
a processor coupled to the storage and configured to execute the program code to cause the data storage apparatus to:
obtain at least one data record from a data table, wherein each data record comprises one carrier identifier and at least one label value which corresponds to the carrier identifier;
create a bitmap index corresponding to the at least one data record, wherein the bitmap index comprises at least one bitmap, wherein each bitmap corresponds to one label value and comprises at least one bitmap position, and wherein each bitmap position in a bitmap of the at least one bitmap records whether a carrier corresponding to one carrier identifier has a label value corresponding to the bitmap;
divide the data table into M data partitions based on a first range of carrier identifiers, wherein each data partition comprises at least one sub-data table, wherein a carrier identifier set corresponding to each data partition is the first range, and wherein there is no intersection set between carrier identifier sets corresponding to different data partitions; and
determine N bitmap index partitions based on the M data partitions, wherein each bitmap index partition comprises at least one sub-bitmap, wherein a carrier identifier range corresponding to each bitmap index partition is greater than or equal to the first range, wherein there is no intersection set between carrier identifier sets corresponding to different bitmap index partitions, wherein M and N are positive integers, wherein N is less than or equal to M, and wherein N is greater than or equal to 2.

10. The data storage apparatus of claim 9, wherein before obtaining the data record, the processor is further configured to execute the program code to cause the data storage apparatus to:
preset a label definition table comprising a plurality of preset label values; and
generate the data table based on to-be-stored source data and the label definition table.

11. The data storage apparatus of claim 10, wherein the label definition table further comprises label configuration information, wherein the label configuration information indicates that the bitmap resides in a memory, and wherein the processor is further configured to execute the program code to cause the data storage apparatus to load, to the memory based on the label configuration information, the bitmap.

12. The data storage apparatus of claim 9, wherein the processor is further configured to execute the program code to cause the data storage apparatus to divide the bitmap index into a plurality of bitmap index partitions, wherein each bitmap index partition comprises at least one sub-bitmap and corresponds to a carrier identifier set, and wherein there is no intersection set between carrier identifier sets corresponding to different bitmap index partitions.

13. The data storage apparatus of claim 12, wherein same bitmap positions in different bitmaps in the bitmap index correspond to a same carrier identifier, wherein same bitmap positions in different sub-bitmaps in each bitmap index partition correspond to a same carrier identifier, and wherein same bitmap positions in different sub-bitmaps in different bitmap index partitions correspond to different carrier identifiers.

14. The data storage apparatus of claim 12, wherein the processor is further configured to execute the program code to cause the data storage apparatus to:
receive a data query request comprising at least one target label value;

determine, from the bitmap index partitions, at least one target sub-bitmap corresponding to the at least one target label value;

determine an identifier of a target carrier corresponding to a target bitmap position comprised in each of the at least one target sub-bitmap;

query the data table for a label value of the target carrier; and feed back the label value of the target carrier.

15. The data storage apparatus of claim 9, wherein the processor is further configured to execute the program code to cause the data storage apparatus to:

obtain new data, wherein a carrier identifier or a label value in a new correspondence comprised in the new data is new; and update the bitmap index based on the new correspondence.

16. The data storage apparatus of claim 15, wherein the processor is further configured to execute the program code to cause the data storage apparatus to:

determine a bitmap index partition to which the carrier identifier in the new correspondence belongs; and update, in the bitmap index partition, the label value in the new correspondence or update a bitmap corresponding to the label value in the new correspondence.

17. A computer program product comprising computer-executable instructions that are stored on a non-transitory computer-readable medium and that, when executed by a processor, cause a data storage apparatus to:

obtain at least one data record from a data table, wherein each data record comprises one carrier identifier and at least one label value which corresponds to the carrier identifier;

create a bitmap index corresponding to the at least one data record, wherein the bitmap index comprises at least one bitmap, wherein each bitmap corresponds to only one label value and comprises at least one bitmap position, and wherein each bitmap position in a bitmap of the at least one bitmap records whether a carrier corresponding to one carrier identifier has a label value corresponding to the bitmap;

divide the data table into M data partitions based on a first range of carrier identifiers, wherein each data partition comprises at least one sub-data table, wherein a carrier identifier set corresponding to each data partition is the first range, and wherein there is no intersection set between carrier identifier sets corresponding to different data partitions; and determine N bitmap index partitions based on the M data partitions, wherein each bitmap index partition comprises at least one sub-bitmap, wherein a carrier identifier range corresponding to each bitmap index partition is greater than or equal to the first range, wherein there is no intersection set between carrier identifier sets corresponding to different bitmap index partitions, wherein M and N are positive integers, wherein N is less than or equal to M, and wherein N is greater than or equal to 2.

18. The computer program product of claim 17, wherein the computer-executable instructions, when executed by the processor, further cause the data storage apparatus to divide the bitmap index into a plurality of bitmap index partitions, wherein each bitmap index partition comprises at least one sub-bitmap and corresponds to a carrier identifier set, and wherein there is no intersection set between carrier identifier sets corresponding to different bitmap index partitions.

19. The computer program product of claim 18, wherein same bitmap positions in different bitmaps in the bitmap index correspond to a same carrier identifier, wherein same bitmap positions in different sub-bitmaps in each bitmap index partition correspond to a same carrier identifier, and wherein same bitmap positions in different sub-bitmaps in different bitmap index partitions correspond to different carrier identifiers.

20. The computer program product of claim 18, wherein the computer-executable instructions, when executed by the processor, further cause the data storage apparatus to:

receive a data query request comprising at least one target label value;

determine, from the bitmap index partitions, at least one target sub-bitmap corresponding to the at least one target label value;

determine an identifier of a target carrier corresponding to a target bitmap position comprised in each of the at least one target sub-bitmap;

query the data table for a label value of the target carrier; and feed back the label value of the target carrier.

21. The computer program product of claim 17, wherein the computer-executable instructions, when executed by the processor, further cause the data storage apparatus to:

preset a label definition table comprising a plurality of preset label values; and generate the data table based on to-be-stored source data and the label definition table.

* * * * *